United States Patent
Hsu

(10) Patent No.: US 8,249,139 B2
(45) Date of Patent: Aug. 21, 2012

(54) APPARATUS FOR DATA RECEIVING AND METHOD FOR ADJUSTING THE SAME IN REAL TIME

(75) Inventor: Mu-Hsien Hsu, Tainan County (TW)

(73) Assignee: Himax Technologies Limited, Tainan City (TW)

( * ) Notice: Subject to any disclaimer, the term of this patent is extended or adjusted under 35 U.S.C. 154(b) by 569 days.

(21) Appl. No.: 12/491,110

(22) Filed: Jun. 24, 2009

(65) Prior Publication Data

US 2010/0329323 A1   Dec. 30, 2010

(51) Int. Cl.
*H04L 27/01* (2006.01)
(52) U.S. Cl. ......................... 375/235; 375/354
(58) Field of Classification Search .................. 375/229, 375/230, 232, 354, 348, 355; 708/323, 300; 327/141

See application file for complete search history.

(56) References Cited

U.S. PATENT DOCUMENTS

| | | | | |
|---|---|---|---|---|
| 5,991,339 A | * | 11/1999 | Bazes et al. | 375/232 |
| 2004/0258145 A1 | * | 12/2004 | Popescu et al. | 375/232 |
| 2005/0135470 A1 | * | 6/2005 | Momtaz | 375/233 |
| 2007/0047680 A1 | * | 3/2007 | Okamura | 375/348 |
| 2009/0224809 A1 | * | 9/2009 | Matsumoto et al. | 327/141 |
| 2010/0046683 A1 | * | 2/2010 | Beukema et al. | 375/355 |
| 2011/0228839 A1 | * | 9/2011 | Agrawal et al. | 375/232 |
| 2011/0310947 A1 | * | 12/2011 | Flynn et al. | 375/229 |
| 2011/0317751 A1 | * | 12/2011 | Roethig et al. | 375/232 |

OTHER PUBLICATIONS

Mitchell Lin and Kwang-Ting (Tim) Cheng, "Testable Design for Adaptive Linear Equalizer in High-Speed Serial Links", University of California, 2006, IEEE.*

* cited by examiner

*Primary Examiner* — Aristocratis Fotakis
(74) *Attorney, Agent, or Firm* — J.C. Patents

(57) ABSTRACT

A data receiver and a method for adjusting the same are provided. The data receiver has an equalizer, a clock data recovery unit, an equalizer controller, and a decoder. The equalizer compensates incoming signal according to a configuration, and outputs corrected signal. The CDR unit uses a clock to sample the corrected signal from the equalizer and generates phase information of the clock. The decoder decodes the raw data. Each cycle of the clock is divided into a plurality of phases, and the phase information indicates the one of the phases that the corrected signal sampled therein. In a testing mode, the equalizer controller applies a plurality of setup values to the configuration individually and records the phase information for tuning the configuration. Therefore, the accuracy of the equalizer is improved and the good signal quality is obtained.

7 Claims, 6 Drawing Sheets

APPARATUS FOR DATA RECEIVING AND METHOD FOR ADJUSTING THE SAME IN REAL TIME

BACKGROUND OF THE INVENTION

1. Field of the Invention

The present invention generally relates to a data transmission, and more particularly, to a data receiver and a method for adjusting the data receiver.

2. Description of Related Art

There are several consumer analog standards for transmitting audio/video data, such as coaxial cable, composite video, S-Video, component video, Video Graphics array (VGA), etc. These consumer analog standards are usually used on audio/video devices, e.g. a digital television, or a DVD player. Analog signals need more bandwidths than digital signals for transmitting audio/video data. With audio/video data streams growing fast, these consumer analog standards can not process a large number of audio/video data in time. Therefore, the High-Definition Multimedia Interface (HDMI) is provided to solve the demand.

There is a plurality of differential signals within a HDMI cable, and the differential signals are utilized to transmit audio/video data. A scheme, Serializer/Deserializer (SERDES), is applied to HDMI. The SERDES includes a pair of functional blocks: a serializer and a deserializer. The serializer is a Parallel-to-Serial converter, and is utilized to convert audio/video data from parallel type into serial type. The deserializer is a Serial-to-Parallel converter, and is utilized to convert audio/video data from serial type into parallel type. In other words, the serializer is a transmitter, and the deserializer is a receiver. Therefore, the transmitter of a SERDES converts audio/video data into differential signal, and outputs the differential signal to the receiver of the SERDES. The receiver of the SERDES receives the differential signal and restores the audio/video data.

FIG. 1 is a functional block diagram of a receiver of a SERDES of the prior art. Referring to FIG. 1, the receiver 100 includes an equalizer (EQ) 101, a Clock and Data Recovery (CDR) unit 103, a decoder (DEC) 105. A differential signal has a pair of two signals P and N. The equalizer 101 receives the differential signal, and compensates the differential signal in order to equalize the compensated differential signal and the differential signal outputted from the transmitter. The CDR unit 103 samples the compensated differential signal for generating raw data. The decoder 105 retrieves the audio/video data from the raw data, and outputs the audio/video data to a video processor (VPU) 107.

During the data transmission between the transmitter and receiver of the SERDES, the differential signal may suffer the attenuation due to a long cable, or the differential signal is too strong to criterion of the receiver 100. The equalizer 101 enlarges the weak differential signal or reduces the strong differential signal according to a configuration TEXT provided from outside of the receiver 100. By tuning the configuration TEXT, the equalizer 101 keeps the differential signal to meet the operating boundary of the CDR unit 103. In tradition, tuning the configuration TEXT can be modified manually in manufacture process, or modified by a software in advance. But these methods cannot handle compensation of the equalizer 101 in real time.

SUMMARY OF THE INVENTION

The present invention provides a data receiver and a method for adjusting the data receiver to improve the accuracy of the data receiver in real time, and a good signal quality is obtained.

The present invention provides a data receiver. The data receiver includes an equalizer, a CDR unit, and an equalizer controller. The equalizer compensates the incoming signal according to a configuration, and outputs the corrected signal. The CDR unit is coupled to the equalizer to receive the corrected signal, uses a clock to sample the corrected signal for generating the raw data, and outputting phase information of the clock. The equalizer controller is coupled to the CDR unit and the equalizer, wherein the equalizer controller receives the phase information, and tunes the configuration in accordance with the phase information.

The present invention provides a method for adjusting a data receiver. The method comprises steps as follows: providing an equalizer for compensating incoming signal to generate corrected signal according to a configuration; providing a CDR unit for sampling the corrected signal with a clock; recording phase information of the clock; and tuning the configuration in accordance with the phase information.

In an embodiment of the foregoing method for adjusting the data receiver, wherein a cycle of the clock is divided into a plurality of phases, and the phase information indicates that the corrected signal is sampled at the k one of the phases, where k is a positive integer.

The present invention provides the data receiver. The equalizer compensates the incoming signal according to the configuration, and outputs the corrected signal. The CDR unit uses the clock to sample the corrected signal from the equalizer and generates phase information of the clock. The equalizer controller tunes the configuration according to the phase information, and therefore improving the accuracy of the data receiver in real time is achieved.

In order to make the features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
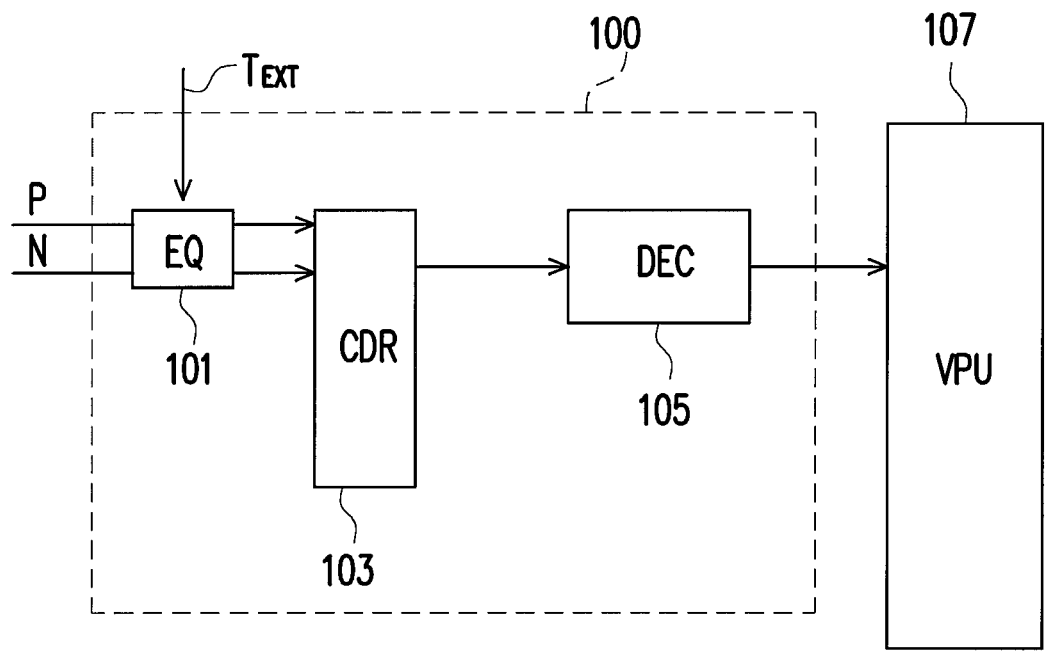
FIG. 1 is a functional block diagram of a receiver of a SERDES of the prior art.

Reference will now be made in detail to the present preferred embodiments of the invention, examples of which are illustrated in the accompanying drawings. Wherever possible, the same reference numbers are used in the drawings and the description to refer to the same or like parts.

Figure 2:
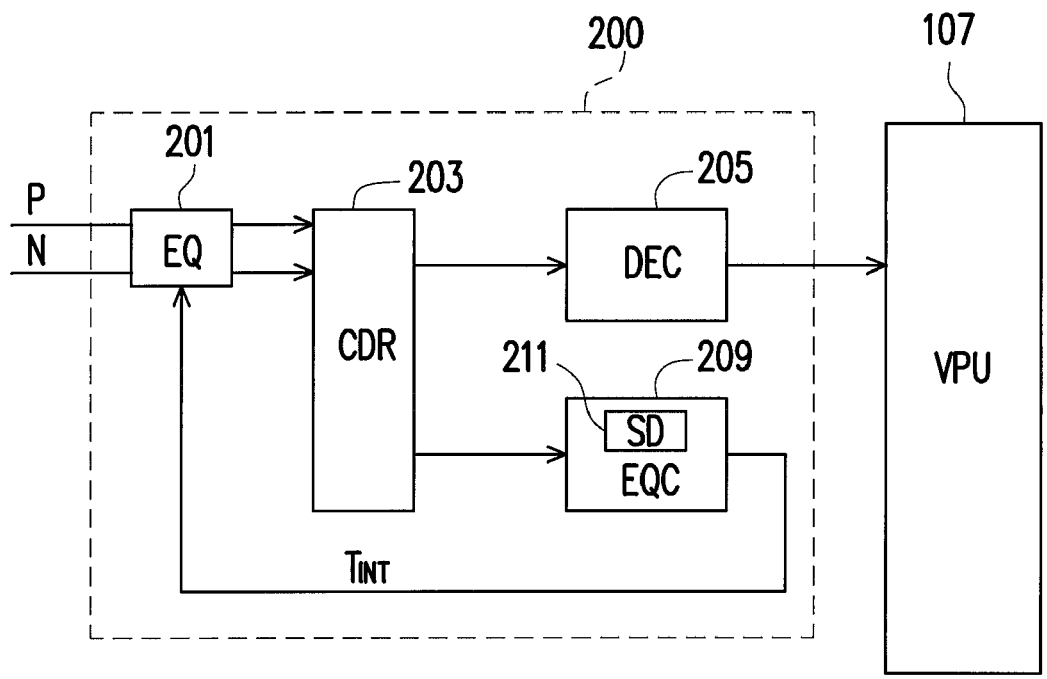
FIG. 2 is a functional block diagram of a data receiver according to an embodiment of the present invention.

FIG. 2 is a functional block diagram of a data receiver according to an embodiment of the present invention. In the present embodiment, the data receiver 200 is a receiver of a SERDES. However, the present invention is not limited thereto. Referring to FIG. 2, the data receiver 200 includes an equalizer (EQ) 201, a CDR unit 203, an equalizer controller (EQC) 209, and a decoder (DEC) 205. The equalizer 201 receives the incoming signal (e.g., the differential signal pair having the signals P and N in FIG. 2), and compensates the incoming signal according to the configuration $T_{INT}$. The incoming signal may suffer the attenuation due to transmission of a long distance, or the incoming signal is too strong to criterion of the equalizer 201. In other words, the equalizer 201 enlarges the weak incoming signal or reduces the strong incoming signal according the configuration $T_{INT}$. Thus, by tuning the configuration $T_{INT}$, the equalizer 201 outputs the compensated incoming signal as the corrected signal to meet the operating boundary of the CDR unit 203. People skilled in the art realize that an equalizer comprises a plurality of components, e.g. capacitors, resistors, inductors, etc. In the present embodiment, there is a plurality of variable capacitors within the equalizer 201, and the configuration $T_{INT}$ can be the capacitances of the variable capacitors. Therefore, People skilled in the art can implement the equalizer 201 in any means according to the above-mentioned characteristic of the equalizer 201, e.g. the equalizer 101 in FIG. 1.

Figure 3:
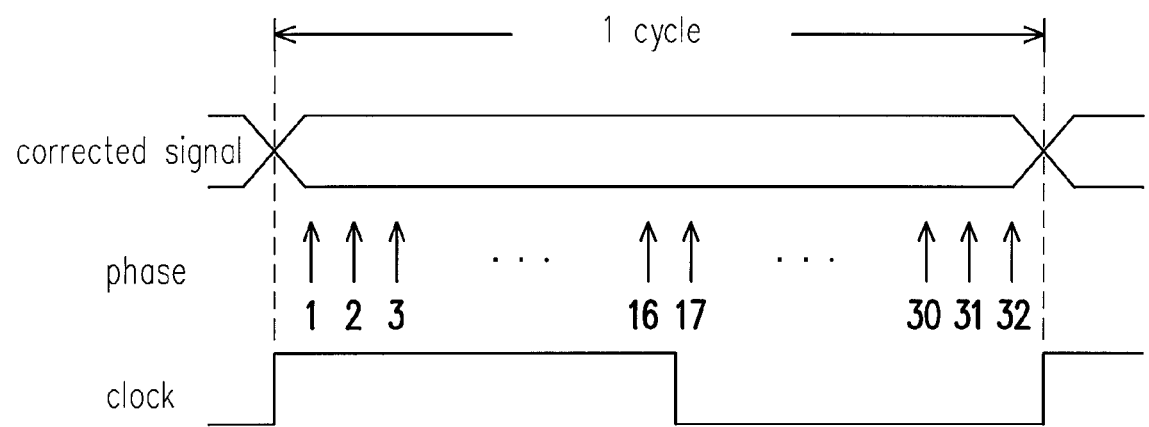
FIG. 3 is a timing diagram of a cycle of a clock according to an embodiment of the present invention.

The CDR unit 203 is coupled to the equalizer 201 to receive the corrected signal. The CDR unit 203 uses a clock to sample the corrected signal for generating raw data. In the present embodiment, the CDR unit 203 generates the clock, and each cycle of the clock is divided into 32 phases, but the present invention is not limited thereto. FIG. 3 is a timing diagram of a cycle of a clock according to an embodiment of the present invention. Referring to FIG. 3, the clock is going in an approximate frequency relative to the corrected signal. During one cycle of the clock, the CDR unit 203 select one of the phases to sample the corrected signal for generating the raw data, and outputs the raw data to the decoder 205. The CDR unit 203 further outputs the phase information of the clock to indicate that the corrected signal is sampled at the $k^{th}$ one of the 32 phases, where k is a positive integer.

The equalizer controller 209 is coupled to the CDR unit 203 and the equalizer 201. In the present embodiment, the testing mode is a process for tuning the configuration $T_{INT}$ according to the phase information. The testing mode can be performed by the equalizer controller 209 when the data receiver is power on. In the testing mode, there is a plurality of adjusting periods for the CDR unit 203 to sample the corrected signal, and the equalizer controller 209 has a plurality of setup values utilized to be outputted to modify the configuration $T_{INT}$. During the $i^{th}$ one of the adjusting periods, the equalizer controller 209 applies the $i^{th}$ one of the setup values to the configuration $T_{INT}$, and records the phase information into an $i^{th}$ one of a plurality of the statistical results, where i is a positive integer. In the present embodiment, i is equal to 4. However, the present invention is not limited thereto. During the $1^{st}$ adjusting period in the testing mode, the equalizer controller 209 applies the 1 setup value to the configuration $T_{INT}$, and outputs the configuration $T_{INT}$ to the equalizer 201. Consequently, the capacitances of the variable capacitors of the equalizer 201 are modified. In the meantime, the CDR unit 203 samples the corrected signal and outputs the phase information sequentially, and the equalizer controller 209 records the phase information in the $1^{st}$ statistical result during the $1^{st}$ adjusting period. The processes in the rest of the adjusting periods are identical to the process in the $1^{st}$ adjusting period. For simplicity's sake, the descriptions of the processes in the rest of the adjusting periods would not be repeated.

Figure 4A:
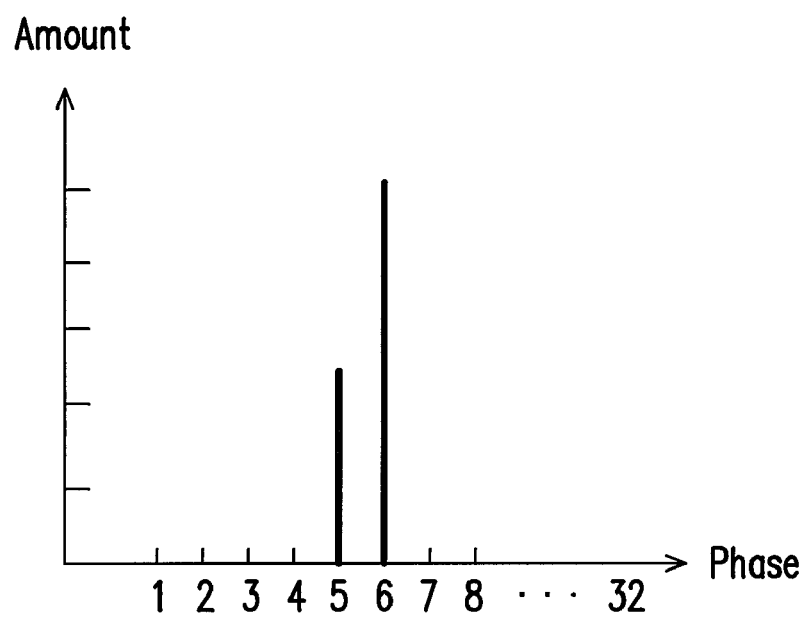
FIG. 4A is a phase distribution chart for good corrected signal quality according to an embodiment of the present invention.
Figure 4B:
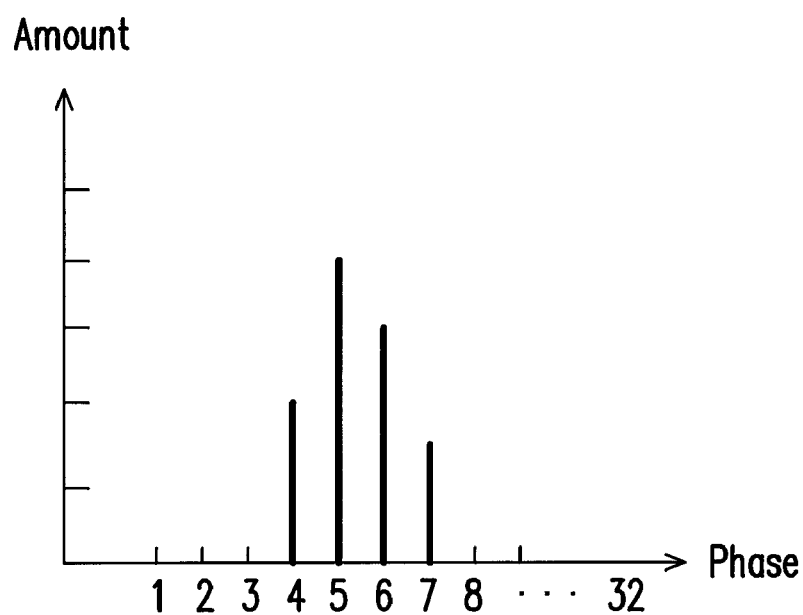
FIG. 4B is a phase distribution chart for poor corrected signal quality according to an embodiment of the present invention.

FIG. 4A is a phase distribution chart for good corrected signal quality according to an embodiment of the present invention. The phase distribution chart shows that the CDR unit 203 samples the corrected signal during one of the adjusting periods. Referring to FIG. 4A, the phases selected for sampling the corrected signal distribute over the $5^{th}$ and $6^{th}$ phases. Since the quality of the corrected signal is good, the corrected signal outputted from the equalizer 201 is stable for being sampled. In other words, it means that there are fewer phases (e.g. 2 phases) used to sample the corrected signal. On the contrary, when the quality of the corrected signal outputted from the equalizer 201 is poor, the corrected signal is unstable for being sampled. FIG. 4B is a phase distribution chart for poor corrected signal quality according to an embodiment of the present invention. Referring to FIG. 4B, the phases selected for sampling the corrected signal distribute over the $4^{th}$, $5^{th}$, $6^{th}$ and $7^{th}$ phases. It means that there are more phases (e.g. 4 phases) used to sample the corrected signal. Therefore, in the present embodiment, when the quality of the corrected signal is good, the CDR unit 203 can sample the corrected signal easily, and the fewer phases are used to sample the corrected signal. When the quality of the corrected signal is poor, the CDR unit 203 may sample the corrected signal hardly, and the more phases are used to sample the corrected signal. It should be noted that the amount of each phase for sampling the corrected signal doesn't correlate with the corrected signal quality. Therefore, the less quantity of the phases that the corrected signal sampled therein, the better signal quality is obtained.

In the present embodiment, the equalizer controller 209 comprises a storage device (SD) 211, and the equalizer controller 209 saves all of the statistical results to the storage device 211. The storage device 211 can be a random access memory (RAM) for example. The equalizer controller 209 searches all of the statistical results for finding the one having the least number of the phases that the corrected signal sampled therein. For example, it is assumed that there are 4 statistical results saved in the storage device 211, and the numbers of the phases of the 4 statistical results are 5, 4, 2, and 7 respectively. The equalizer controller 209 chooses the $3^{rd}$ statistical result as the best one of the 4 statistical results. Thus the corresponding one of the setup values, i.e. the $3^{rd}$ setup value, is the best one, and the equalizer controller 209 applies the $3^{rd}$ setup value to the configuration $T_{INT}$. Accordingly, a good signal quality is obtained, and the testing mode is finished. It should be noted that the testing mode can be performed any time, if necessary. For example, the equalizer controller 209 monitors the phase information, and finds that the corrected signal quality is growing worse. Moreover, the decoder 205 is coupled to the CDR unit 203 to receive the raw data, and retrieves the audio/video data from the raw data. Therefore, an external device, e.g. the video processor (VPU) 107, can be coupled to the CDR unit 203 to receive the video data.

Figure 5:
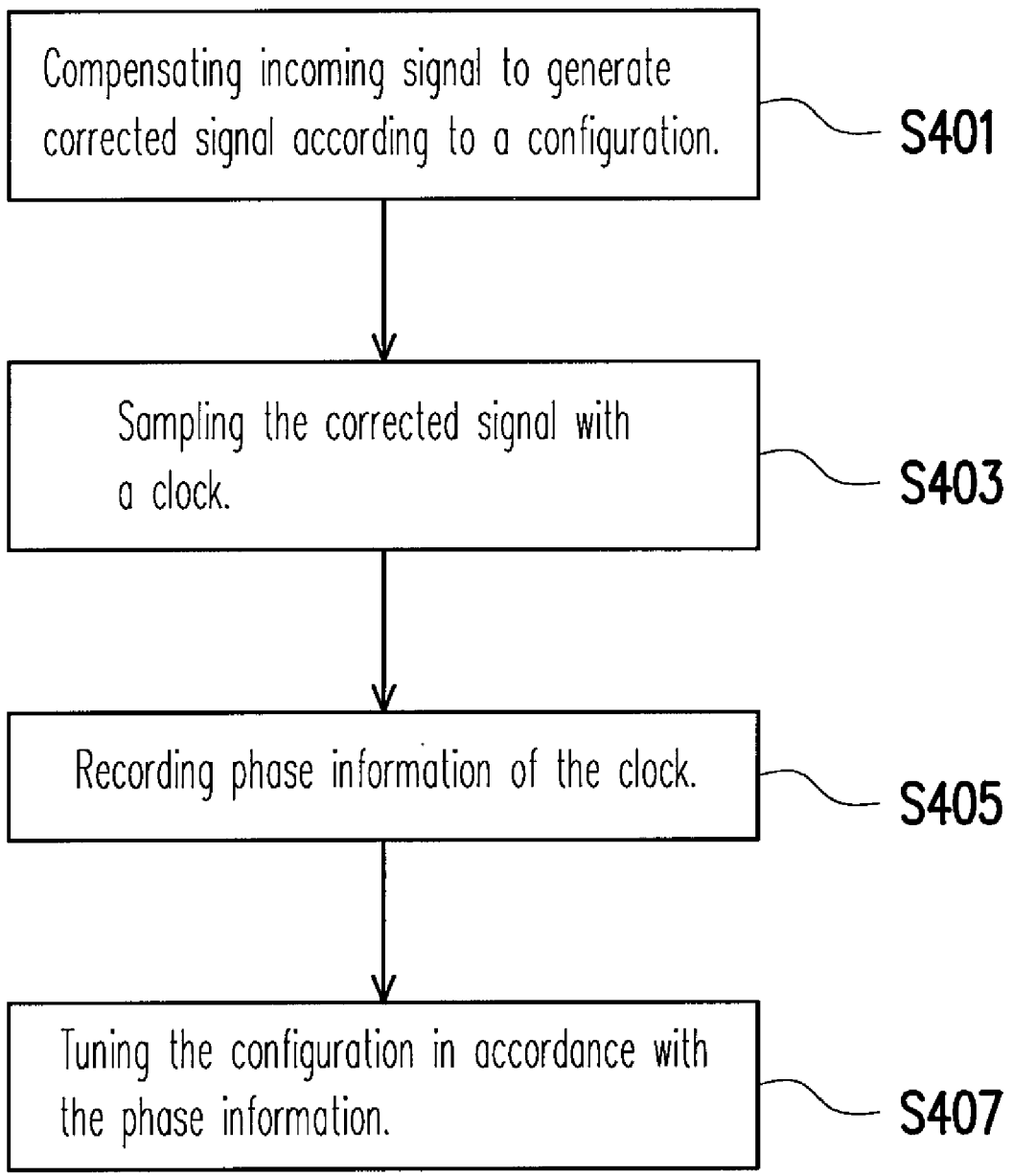
FIG. 5 is a flowchart of a method for adjusting a data receiver according to an embodiment of the present invention.

FIG. 5 is a flowchart of a method for adjusting a data receiver according to an embodiment of the present invention. Referring to FIG. 5, the method for adjusting the data receiver 200 is introduced as follows. Step S401 is performed to provide an equalizer 201 for compensating incoming signal to generate corrected signal according to a configuration $T_{INT}$. In step S403, a CDR unit 203 is provided to sample the corrected signal with a clock. Step S405 is performed to record phase information of the clock. In the present embodiment, a cycle of the clock is divided into a plurality of phases, and the phase information indicates that the corrected signal is sampled at the $k^{th}$ one of the phases, where k is a positive integer. Step S407 is performed to tune the configuration $T_{INT}$ in accordance with the phase information.

Figure 6:
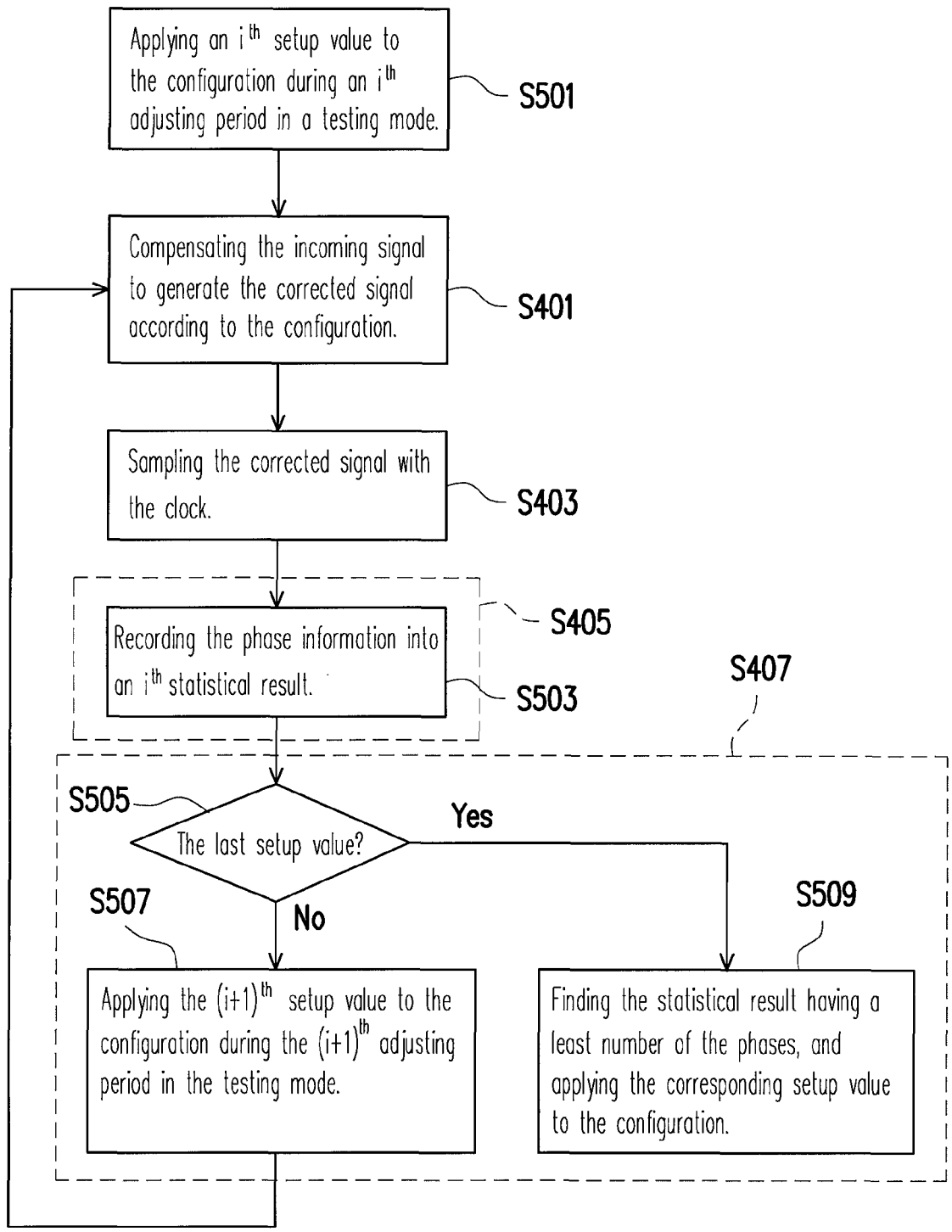
FIG. 6 is another flowchart of a method for adjusting a data receiver according to an embodiment of the present invention.

FIG. 6 is another flowchart of a method for adjusting a data receiver according to an embodiment of the present invention. Referring to FIG. 6. In step S501, an $i^{th}$ one of a plurality of setup values is applied to the configuration $T_{INT}$ during an $i^{th}$ one of a plurality of adjusting periods in a testing mode, where i is a positive integer. For example, the initial one ($1^{st}$) of the setup values is applied to the configuration $T_{INT}$ during the $1^{st}$ one of the adjusting periods in the testing mode. The description of the steps S401-S403 is the same as those in FIG. 5. For simplicity's sake, please refer to the description of the steps S401-S403 in FIG. 5.

The embodiment of the step S405 includes Step S503. The step S503 is performed to record the phase information into an $i^{th}$ one of a plurality of statistical results during the $i^{th}$ one of the adjusting periods in the testing mode. Step S407 is performed to tune the configuration $T_{INT}$ in accordance with the phase information.

The embodiment of the step S407 is introduced as follows. In step S505, it is determined whether the $i^{th}$ one of the setup values applied to the configuration $T_{INT}$ is the last one of the setup values. If the $i^{th}$ one of the setup values is the last one, step S509 is performed; otherwise, step S507 is performed. The step S509 is performed to find the one of the statistical results having a least number of the phases that the corrected signal sampled therein, moreover, the corresponding one of the setup values is applied to the configuration $T_{INT}$. Thus a good signal quality is obtained. In the step S507, the $(i+1)^{th}$ one of the setup values is applied to the configuration $T_{INT}$ during the $(i+1)^{th}$ one of the adjusting periods in the testing mode. After the step S507, the step S401 is repeated. Furthermore, in the present embodiment, the method for adjusting a data receiver is adapted to a receiver of a SERDES.

Figure 7:
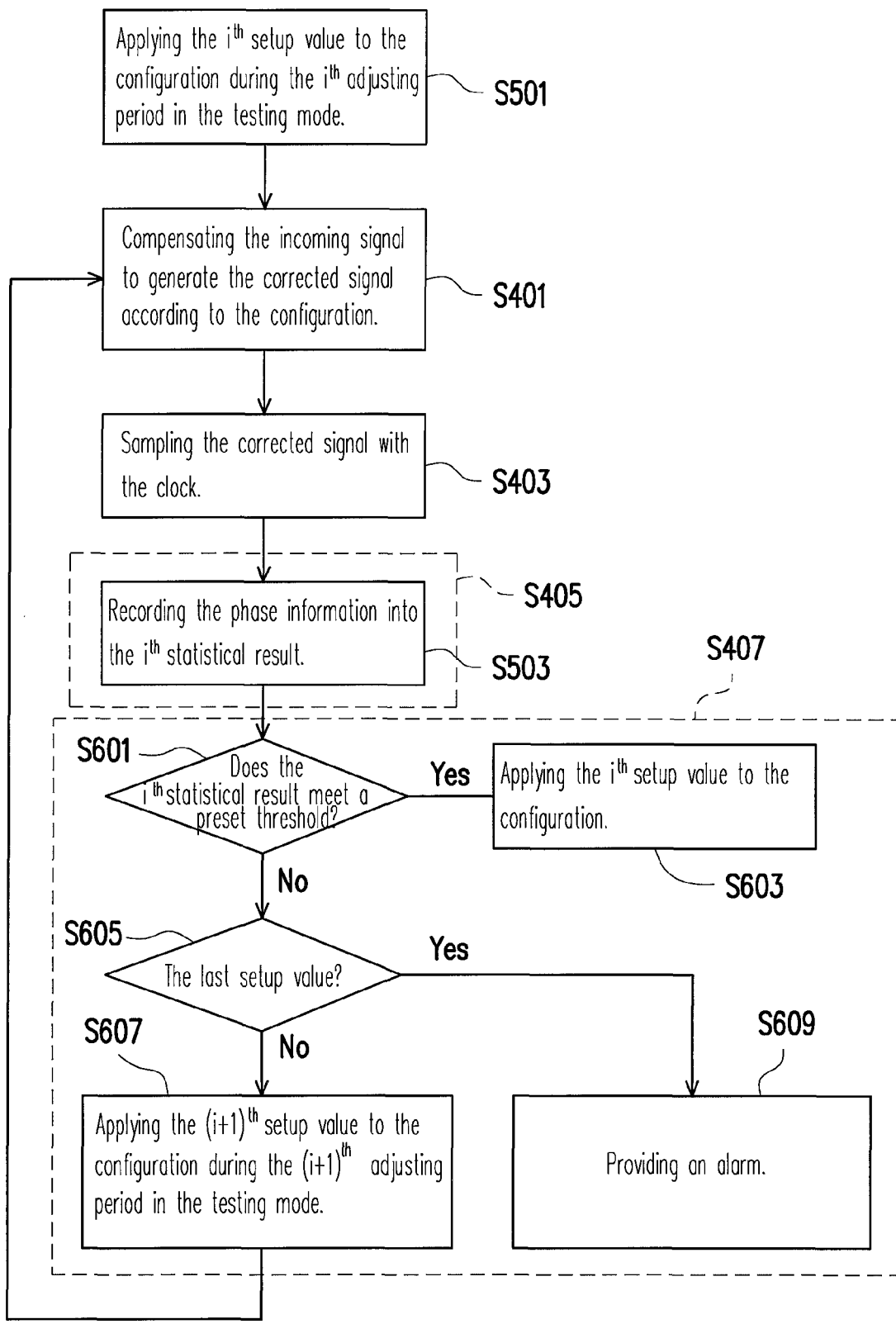
FIG. 7 is another flowchart of a method for adjusting a data receiver according to an embodiment of the present invention.

In the present embodiment, the step S407 can be performed in another way. FIG. 7 is another flowchart of a method for adjusting a data receiver according to an embodiment of the present invention. Referring to FIG. 7, the step S407 is introduced as follows. In step S601, it is determined whether the $i^{th}$ one of the statistical results meets a preset threshold. The preset threshold can be determined from the prior experience or experiment. For example, when the number of the phases recorded in the $i^{th}$ one of the statistical results meets the preset threshold, step S603 is performed; otherwise, step S605 is performed. The step S603 is performed to apply the $i^{th}$ one of the setup values to the configuration $T_{INT}$. In the step S605, it is determined whether the $i^{th}$ one of the setup values applied to the configuration $T_{INT}$ is the last one of the setup values. If the $i^{th}$ one of the setup values is the last one, step S609 is performed; otherwise, step S607 is performed. In the step S609, an alarm is provided to announce that the appropriate one of the setup values in not found in the testing mode. The alarm can be implemented by a bell or a short voice message. In the step S607, the $(i+1)^{th}$ one of the setup values is applied to the configuration $T_{INT}$ during the $(i+1)^{th}$ one of the adjusting periods in the testing mode. After the step S607, the step S401 is repeated.

In summary, the equalizer compensates the incoming signal according to the configuration $T_{INT}$, and outputs the corrected signal. The CDR unit uses a clock to sample the corrected signal from the equalizer and generates the phase information of the clock. Each cycle of the clock is divided into a plurality of the phases, and the phase information indicates the one of the phases that the corrected signal sampled therein. In a testing mode, during each one of the adjusting periods, the equalizer controller applies a corresponding one of the setup values to the configuration $T_{INT}$, and records the phase information in a corresponding one of the statistical results. The equalizer controller finds the statistical result having least number of the phases that the corrected signal sampled therein, and applies the corresponding one of the setup values to the configuration $T_{INT}$. Therefore, the good signal quality is obtained.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data receiver, comprising:
an equalizer, compensating incoming signal according to a configuration, and outputting corrected signal;
a clock data recovery (CDR) unit, coupled to the equalizer to receive the corrected signal, using a clock to sample the corrected signal for generating raw data, and outputting phase information of the clock; and
an equalizer controller, coupled to the CDR unit and the equalizer, wherein the equalizer controller receives the phase information, and tunes the configuration in accordance with the phase information,
wherein during an $i^{th}$ one of a plurality of adjusting periods in a testing mode, the equalizer controller applies an $i^{th}$ one of a plurality of setup values to the configuration, the CDR unit utilizes the clock to sample the corrected signal, and the equalizer controller records the phase information into an $i^{th}$ one of a plurality of statistical results, where i is a positive integer,
wherein a cycle of the clock is divided into a plurality of phases, and the phase information indicates that the CDR unit samples the corrected signal at a $k^{th}$ one of the phases, where k is a positive integer,
wherein the equalizer controller further finds the one of the statistical results having a least number of the phases used to sample the corrected signal, and applies the corresponding one of the setup values to the configuration.

2. The data receiver as claimed in claim 1, further comprising a decoder, coupled to the CDR unit to receive the raw data for generating original data.

3. The data receiver as claimed in claim 1, wherein the equalizer controller comprises:
a storage device, the equalizer controller saving the plurality of the statistical results to the storage device.

4. The data receiver as claimed in claim 1 is a receiver of a Serializer/Deserializer (SERDES).

5. A method for adjusting a data receiver, the method comprising:
applying an $i^{th}$ one of a plurality of setup values to a configuration during an $i^{th}$ one of a plurality of adjusting periods in a testing mode, where i is a positive integer;
compensating incoming signal to generate corrected signal according to the configuration by an equalizer;
sampling the corrected signal with a clock by a CDR unit;
recording phase information of the clock; and
tuning the configuration in accordance with the phase information by an equalizer controller,
wherein a cycle of the clock is divided into a plurality of phases, and the phase information indicates that the corrected signal is sampled at a $k^{th}$ one of the phases, where k is a positive integer, wherein the step for recording the phase information comprises:

recording the phase information into an $i^{th}$ one of a plurality of statistical results during the $i^{th}$ one of the adjusting periods in the testing mode, wherein the step for tuning the configuration comprises:

determining whether the $i^{th}$ one of the setup values applied to the configuration is the last one of the setup values; and finding the one of the statistical results having a least number of the phases used to sample the corrected signal, and applying the corresponding one of the setup values to the configuration.

6. The method as claimed in claim 5, wherein the step for tuning the configuration further comprises:

applying the $(i+1)^{th}$ one of the setup values to the configuration during the $(i+1)^{th}$ one of the adjusting periods in the testing mode when the $i^{th}$ one of the setup values applied to the configuration is not the last one of the setup values.

7. The method as claimed in claim 5 is adapted to a receiver of Serializer/Deserializer (SERDES).

* * * * *